May 19, 1953
J. W. CLARK ET AL
2,639,397
VACUUM GAUGE OF THE IONIZATION PRODUCING TYPE
Filed June 4, 1949
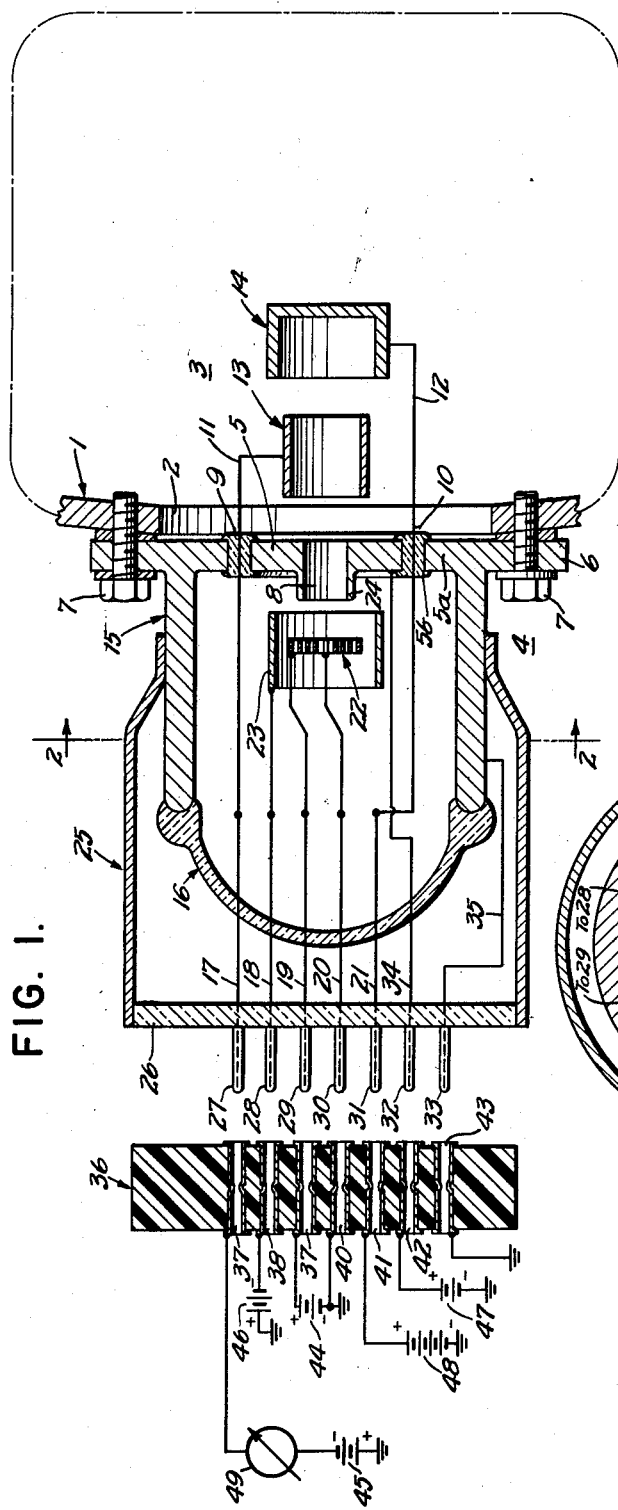
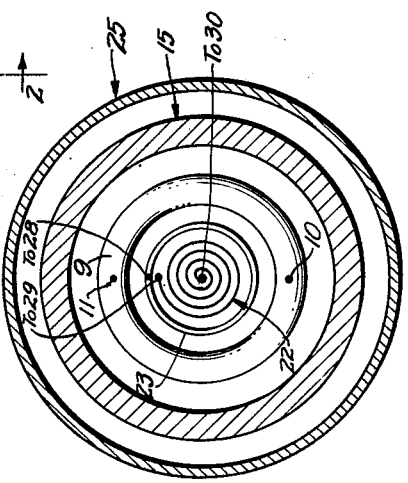
INVENTORS
JOHN W. CLARK
STERLING G. M<sup>c</sup>NEES
BY John J. Rogan
ATTORNEY Patented May 19, 1953

2,639,397

UNITED STATES PATENT OFFICE 2,639,397

VACUUM GAUGE OF THE IONIZATION PRODUCING TYPE

John W. Clark and Sterling G. McNees, Cedar Rapids, Iowa, assignors to Collins Radio Company, Cedar Rapids, Iowa, a corporation of Iowa Application June 4, 1949, Serial No. 97,254

5 Claims. (Cl. 313—7)

This invention relates to vacuum or pressure measurement, and more particularly to the measurement of vacuum or pressure, through the intermediary of ionization.

A principal object of the invention is to provide an improved vacuum or pressure measuring attachment, particularly suitable for use with Cyclotrons, Resnatrons, and like devices.

Another object is to provide a unitary vacuum or pressure measuring attachment composed of two sections; one section to be located within the space where the vacuum or pressure is to be measured, and the other section to be located outside the said space.

Another object is to provide a vacuum or pressure measuring attachment employing an ionizing electron source in the form of a focussed or well-defined electron beam, which source is located outside the space to be measured; and an ion collector section within the space where the vacuum or pressure is to be measured.

A feature of the invention relates to an ionization producing and collecting unit for removable attachment to the wall of an enclosing chamber wherein the vacuum or pressure is to be measured.

Another feature relates to an improved ionization gauge which is of sturdy mechanical structure, and adapted for expeditious attachment to the wall of a chamber wherein gas or vapor pressure conditions are to be determined.

A still further feature relates to the novel organization, arrangement and relative location and interconnection of parts which cooperate to provide a detachable pressure measuring device for evacuated chambers.

Other features and advantages not particularly enumerated, will be apparent after a consideration of the following detailed descriptions and the appended claims.

In the drawing, which shows by way of example one preferred embodiment,

Fig. 1 is a longitudinal sectional view of a device according to the invention.

Fig. 2 is a sectional view of Fig. 1 taken along the line 2—2 thereof.

In the drawing, the numeral 1 represents the enclosing wall of a chamber wherein a predetermined vacuum or gas pressure is to be maintained. For example, it may represent the enclosing wall of a Cyclotron, a Resnatron, or similar electron discharge device wherein the degree of vacuum is required to be maintained with predetermined limits. The wall 1 has an opening 2 for the reception of the ion collecting section of the gauge according to the invention. This gauge comprises, in general, the two sections 3 and 4; section 3 being the ion collecting section to be removably inserted into the vacuum chamber through the opening 2, and the section 4 being the electron beam producing section which together with the section 3 is to be detachably fastened as a unit to the external wall of the vacuum chamber. It will be understood that the various electrodes constituting sections 3 and 4 are mechanically interconnected to form a structural unit which can be readily attached in a vacuum-tight manner to the wall 1 of the vacuum chamber. This unit can comprise a metal header comprising a center circular section 5 and a surrounding annular section 5a which is joined to section 5 by a ring 5b of suitable insulation such as glass or ceramic. The section 5a has a flange 6 arranged to be attached to the wall 1 by suitable bolts 7, and with any well-known intervening vacuum-tight sealing rings, washers, or the like, to seal the bolted joints.

The header section 5 has a central opening 8 for registry with opening 2. Respective metal rods or wires 11, 12, which pass through the insulator ring 5b, are arranged to be attached to, and mechanically support, the respective electrodes 13, 14, of the ionization section 3. Electrode 13 may be in the form of a metal cylinder which is appropriately negatively biassed so as to act as an ion collector. The electrode 14 may be in the form of a metal cup and appropriately positively biassed to act as an electron collector; it being understood that electrodes 13 and 14 are mounted in coaxial alignment with opening 8.

Header section 5a has a cylindrical flange 15 to which is sealed, in a vacuum-tight manner, a glass header 16 and through which are sealed in a vacuum-tight manner the lead-in rods or wires 17—21. Supported on wires 18, 19, is an electron emitting member or cathode 22 which may be in the form of a convoluted metal filament or strip, coated with a material or materials which emit electrons when the filament or strip is raised to emitting temperature. Since cathodes of this type are well-known in the art, detailed description thereof is not required herein. Supported on wire 20, and surrounding the cathode 22, is a metal electron focussing cylinder 23 which is arranged coaxially with opening 8, but spaced from the header section 5. The header section 5 around the opening 8 has an integral short cylindrical flange 24 which is of smaller diameter than the cylinder 23. The header section 5 is arranged to be positively biassed with respect to the cathode to act as an electron accelerator so that the elements 23 and 24 form in effect an electron lens for concentrating the electrons from cathode 22 into a focussed relatively high velocity electron beam which passes substantially centrally through opening 8.

In order to protect the glass header 16, a suitable metal ferrule 25 is attached to the header section 5 in any suitable manner, and the ferrule 25 carries an insulation header or disc 26. The header 26 in turn carries the contact prongs 27—33 which are electrically connected to the corresponding wires 17—21 and to the wires 34, 35. Adapted to be removably connected with the prongs 27—33 is an insulator connector member 36 having a series of spring sockets 37—42 mounted therein and connected to respective lead wires, which in turn apply the appropriate biassing potentials to the various electrodes. The heating current for cathode 22 is supplied by a suitable current source represented schematically by battery 44 which is connected through springs 39 and 40 to prongs 29 and 30. Likewise, the prong 27 can be connected through socket contact 37 to a suitable negative biassing potential represented schematically by battery 45. For example by this arrangement, the electrode 13 can be biassed approximately —15 volts with respect to the cathode. Likewise the focussing cylinder 23 can be connected through prong 28 and socket contact 38, to a negative biassing potential represented schematically by battery 46. The header section 5, and therefore the focussing flange 24, can be connected through prong 32 and socket contact 42, to a suitable high positive direct current potential, for example +150 volts direct current, as represented schematically by the battery 47. Similarly, the electron collector 14 can be connected through prong 31 and spring contact 41, to a suitable positive direct current biasing potential represented by battery 48.

Arranged to be connected in circuit with the ion collector 13, is a suitable indicator 49 which indicates the amount of ionic current flowing to the electrode 13. The indicator 49 can be calibrated in terms of gas pressure or vacuum as is well-known in the art.

With the foregoing arrangement, the gauge can be readily attached to any chamber wherein the vacuum or pressure conditions are to be measured, and the ion collection section 3 can be located at the proper point to enable the pressure at that point to be determined accurately and instantaneously. By separating the electron source, which includes the electron emitter 22, from the ion collecting source, it is possible to protect the hot cathode to a great extent from oil or other vapors which may be present in the vacuum chamber enclosed by wall 1, while at the same time protecting the cathode to a great extent from "gas bursts" within said chamber. Consequently false pressure readings due to gas which in the ordinary gauge constructions is absorbed by or emitted by the filamentary cathode, will not occur. Since the electrons which produce the ionization are in the form of a focussed beam, they are substantially entirely focussed through the opening 8, the cylindrical wall of which acts as an electron accelerator and from which they emerge into the vacuum system within the chamber 1, in a relatively sharp beam. In the well-known manner, these focussed electrons produce ions in the evacuated space within the chamber 1 at a rate proportional to the current in the electron beam itself, and to the pressure of gas or vapor within the chamber 1. The resultant ions are collected by the electrode 13 which is maintained approximately 15 or 20 volts negative with respect to the cathode 22. Furthermore, the electrons being at relatively high velocity and in a constricted beam, pass freely through the electrode 13 and are substantially all collected by the electron collector 14. Thus the filamentary cathode is contained in a separate small chamber where it is fairly well protected from contamination by the vacuum system in chamber 1. However the measuring portion of the gauge device, constituted by the cylinder 13, is directly in the vacuum system proper within the chamber 1. Instead of making the electrode 13 of a simple cylinder, its wall may be perforated or otherwise rendered foraminous, so as to increase the percentage of interaction between the electron beam and the gas or vapor within the chamber 1. Furthermore, while separate batteries are schematically illustrated for biassing the various electrodes, it will be understood that a single direct current source such as a conventional direct current power supply may be employed with suitable potential taps to the various electrodes as indicated. Furthermore, while the drawing shows one particular arrangement of cathode and focussing and accelerating electrodes for developing a focussed electron beam, it will be understood that any other well-known electron gun for developing such a beam, can be used.

While one particular embodiment has been described herein, it will be understood that various changes and modifications may be made therein without departing from the spirit and scope of the invention.

What is claimed is:

1. A unitary device for external attachment to and insertion through the wall of an evacuated chamber for determining the degree of vacuum within the chamber by ionization, comprising a housing enclosing a first sub-assembly consisting of an electron emitter and electron beam focussing electrodes, means removably attaching said housing in a vacuum-tight manner to the external wall of the chamber, said housing having an opening in registry with a corresponding opening in said wall and through which said beam is projected, and another sub-assembly consisting of an electron collector electrode and an ion collector electrode forming a structural unit with said first-mentioned sub-assembly for insertion of said other sub-assembly through said opening into the chamber at the point where the degree of vacuum is to be determined.

2. A unitary device for external attachment to the wall of an evacuated chamber for determining the degree of vacuum within the chamber by ionization, comprising a metal header, means to attach said header in a vacuum-tight manner to said wall and with an opening in the header in registry with an opening with said wall, means carried by said header and forming a closed housing, means to support a first sub-assembly consisting of an electron emitter and electron beam focussing electrodes within said housing for alignment with said openings, a second sub-assembly consisting of an electron collector electrode and an ion collector electrode, said sub-assemblies being mechanically interconnected to form a unit for enabling the second sub-assembly to be inserted into said chamber while having the first sub-assembly external to said chamber, and lead-in means sealed in a vacuum-tight manner through said housing for applying relative biasing potentials to said emitter, to said focussing electrodes and to said collector electrodes for the purpose set forth.

3. A unitary ionization gauge device, comprising a first electron beam developing section, a second ion collecting section, means mechanically interconnecting said sections as a unit for insertion of the second section through an opening in the wall of said chamber to the point where the vacuum is to be measured, a vacuum-tight housing for said first section, means to support said first section within said housing in alignment with said opening and to support said second section within the chamber and in alignment with said opening, and lead-in wires sealed through said housing for applying relative biasing potentials to the electrodes of both sections.

4. An ionization gauge device according to claim 3, in which the first section includes an electron-emitting cathode and beam focussing and accelerating electrodes, and said second section includes an electron collector electrode and an intervening ion collector electrode.

5. An ionization gauge device according to claim 3, in which said housing is closed by a metal header arranged to be attached to the wall of said chamber, said metal header having an opening in registry with a corresponding opening in said wall, and an integral flange surrounding said opening and forming an electron accelerating and focussing electrode.

JOHN W. CLARK.
STERLING G. McNEES.

References Cited in the file of this patent

UNITED STATES PATENTS

| Number | Name | Date |
|---|---|---|
| 2,081,429 | Gaede | May 25, 1937 |
| 2,347,328 | Marton | Apr. 25, 1944 |
| 2,375,280 | Calbick | May 8, 1945 |
| 2,501,702 | Varian | Mar. 28, 1950 |